June 13, 1950 — F. D. PATTI — 2,511,786
HEAT INSULATING HANDLE FOR COOKING UTENSILS
Filed Dec. 28, 1945
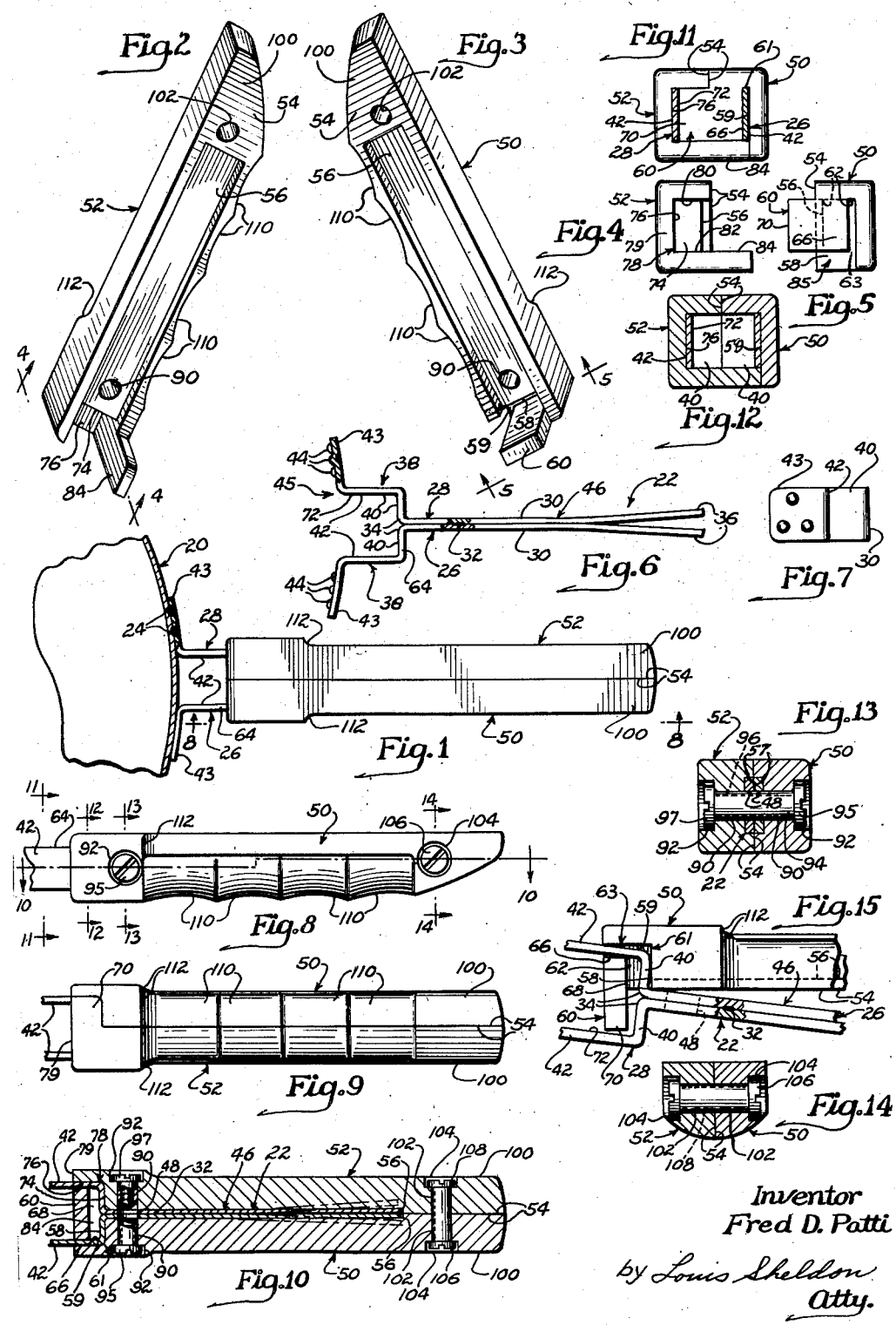
Inventor
Fred D. Patti
by Louis Sheldon
Atty.

Patented June 13, 1950

2,511,786

UNITED STATES PATENT OFFICE 2,511,786

HEAT INSULATING HANDLE FOR COOKING UTENSILS

Fred D. Patti, Chicago, Ill., assignor to Steelco Stainless Steel, Inc., Chicago, Ill., a corporation of Illinois Application December 28, 1945, Serial No. 637,682

10 Claims. (Cl. 16—116)

1

This invention relates to handles adapted for, but not limited to, use in connection with pans and other cooking utensils.

It is an object of my invention to provide a heat insulating handle construction which may be inexpensively manufactured and readily assembled.

An additional object of my invention is to provide a handle construction including handle parts adapted to be held together by screw means, the operation being such as to resist loosening thereof.

A further object is to provide an insulating handle mounted on a core in such manner as to be incapable of rotating on the core even when the fastening means therefor becomes loose.

Another object is to provide a novel handle construction involving a core adapted to be secured to a pan or the like and insulating mating handle elements adapted to be mounted about the core expeditiously.

It is also an object to provide an insulating handle structure including a metallic core adapted to be fastened to a pan or the like, the user's hand being protected against contact with the core.

It is another object to provide a multi-part handle whose parts are readily replaceable.

Further objects and advantages of my invention will appear as the description proceeds. The invention will be better understood upon reference to the following description and accompanying drawings in which:

Fig. 1 is a plan view of an embodiment of my invention with attached utensil.

Figs. 2 and 3 are inside isometric views of the two mating exterior parts of the handle.

Fig. 4 is an end elevation taken as indicated by the line 4—4 in Fig. 2.

Fig. 5 is an end elevation taken as indicated by the line 5—5 in Fig. 3.

Fig. 6 is a plan view of the metal core of the handle, before assembly with the other parts.

Fig. 7 is an end elevation of one of the core members.

Fig. 8 is a left side elevation taken as indicated by the line 8—8 in Fig. 1.

Fig. 9 is a bottom plan view of the handle.

Figs. 10, 11, 12, 13 and 14 are sectional views taken as indicated by the lines 10—10, 11—11, 12—12, 13—13 and 14—14, respectively, in Fig. 8.

Fig. 15 is a fragmentary bottom plan view showing a preliminary step in the order of assembly of the parts.

Referring now more particularly to the drawings, I have shown for illustrative purposes a portion of a pan 20 or other utensil or other article to which a preferably stainless steel or other suitable core 22 in accordance with my invention is projection welded as shown at 24 or otherwise suitably secured. The core may be formed of two identical pieces of sheet metal as shown at 26 and 28, having stems 30 spot welded together as at 32 adjacent one end 34 of such stems, the other end portions 36 of said stems being divergent. Each core piece has a substantially Z formation 38 at the end 34 of its stem 30, providing a connected flange 40, a web 42 extending substantially parallel to and away from the stem, and a free flange 43 which is depressed at spaced points to provide projections 44 whereby the flange is projection welded as at 24 to the pan or the like, said Z-formations together forming a yoke 45, and the stems together forming a shank 46. A hole 48 is formed transversely through the stems 30 adjacent the Z-formations.

The insulating handle structure comprises two mating or complemental handle elements 50 and 52 of plastic, Bakelite, wood or other suitable insulating material, in certain respects identical and in others different. Each has a flat inner surface 54 with a longitudinal depression 56 intermediate the ends of said element, said depression being adapted to receive one of the aforesaid stems of said core, so that, when said stem is fitted therein, the exposed surface 57 of said stem preferably does not project outwardly beyond said surface of the handle element.

The handle element 50, adjacent one end of said depression 56, has walls 58 and 59 and a lug 60 forming a recess 61 which is L-shaped in horizontal cross-section and accommodates the connected flange 40 and the adjacent portion of the web 42 of the Z-formation, when a stem 30 is fitted in said depression. The L-shaped recess is closed at one side 62 and open at the other side 63. When the handle element 50 is to be assembled with one of the core pieces, say the core piece 26, it is necessary merely to substantially aline the L-shaped recess 61 with the corresponding L-shaped portion of the Z-formation of the core piece 26 and lower the handle element 50 until the closed side 62 of the L-shaped recess abuts the top edge 64 of the core piece 26. Inasmuch as the surface 54 of the handle element 50 is raised relative to the longitudinal depression 56 therein, the branch 66 of the L-shaped recess accommodating the web 42 is made of somewhat greater depth than the thickness of the core piece. If such depth were made at least equal to twice the thickness of the core piece, the web 42 would slide directly thereinto, without the necessity for tilting, but then there would remain an opening of substantial size through which dirt might enter. It is therefore desirable that the depth of the branch 66 of the L-shaped recess 61 be kept to a minimum. Accordingly, if such depth is only slightly greater than the thickness of the core piece, say about .010", such as may amount to a manufacturing tolerance, it is possible to effect entrance of the core piece 26 into the L-shaped recess 61 pursuant to slight relative tilting or rocking. This is depicted in highly exaggerated form in the inverted arrangement of Fig. 15, and, when the core piece 26 engages the side wall 62 of said recess, the handle element 50 is retilted to lodge the stem 30 in the longitudinal depression 56. It will be noted that the branch 68 of the L-shaped recess 61 is also made over-size to provide clearance for the tilting above referred to.

After the handle element 50 is mounted as above described, the other handle element 52 is applied. This operation requires no manipulation other than merely slipping the element 52 transversely (horizontally) into position. The lug 60 on the handle element 50 has a portion 70 projecting beyond the surface 54 of the handle element 50 and substantially abutting the inner surface 72 of the web 42 of the core piece 28. The handle element 52, adjacent one end of the depression 56 therein, has walls 74 and 76 forming a recess 78 which extends to the free end 79 of the handle element 52. The stem 30, flange 40 and adjacent portion of the web 42 of the core piece 28 are accommodated in said depression 56 and recess 78. The recess 78 is closed at both sides 80 and 82 between which is nested the projecting portion 70 of the lug 60 of the handle element 50. A lug 84 forming an extension of the wall 82 beyond the surface 54 of the handle element 52 is accommodated in a recess 85 between the bottom of the lug 60 and the bottom of the handle element 50, affording a passage for entrance of the core piece 26 into the L-shaped recess 61 in the handle element 50. It is thus apparent that the handle elements 50 and 52 closely embrace the webs 42 of the core pieces 26 and 28.

The handle elements 50 and 52 have bores 90 in line with the bore 48 in the core 22, the bores 90 being counter-bored as at 92. A sleeve nut 94 having a head 95 in one of the counter-bores 92 accommodates the thread of a screw 96 whose head 97 is disposed in the other counter-bore.

The end portions 100 of the handle elements 50 and 52 are formed with bores 102 and counter-bores 104, accommodating a nut 106 and screw 108, the heads preferably being disposed within the confines of the handle elements as aforesaid, when these are tightened. The divergent stem ends 36, when the assembly is complete, are flexed toward each other and hence constantly exert a force holding the threads of the last mentioned nut and screw means 106, 108 in tight interengagement whereby to resist loosening thereof. Inasmuch as the rear nut and screw means 106, 108 have no contact with the core 22, said means will be relatively unheated.

The handle elements may be formed with finger receiving recesses 110 and shoulders 112 to assist in preventing the fingers of the hand holding the same from sliding into engagement with the nut and screw means 94, 96 or the metallic core 22 adjacent the thumb end of the handle. In this connection it is to be noted that the handle is preferably made extra long so that the user's hand may be conveniently accommodated on the handle beyond the nut and screw means 94, 96.

Briefly reviewing the foregoing as far as the assembly of the parts is concerned, it will be observed that the handle element 50 is first slipped into place essentially by a downward movement followed by a tilting movement, and thereafter the other handle element 52 is slipped transversely toward the first element, so that effectually with these two movements the parts are in assembled relation. There then remains merely the acts of fastening the two nut and screw means in place.

Various modifications coming within the spirit of my invention may suggest themselves to those skilled in the art, and hence I do not wish to be limited to the specific form shown or uses mentioned, except to the extent indicated in the appended claims, which are to be interpreted as broadly as the state of the art will permit.

I claim:

1. A handle construction comprising a metallic core having a yoke adapted to be secured to a pan or other article and having a shank, a pair of mating handle members enveloping said shank from opposite sides and having means extending across an end of said shank in the crotch of said yoke, fastening means passing through said handle members and shank adjacent said yoke, and fastening means spaced from said core and passing through said handle members, said shank having a bifurcated free end portion, the arms of which tend to separate by reason of their resilience, said handle members holding said arms in closer juxtaposition than when said arms are free, the fastening means spaced from said core being threaded, whereby the resilience of said arms resists loosening of said threaded means.

2. In a handle construction, a core adapted for securement to a pan or other article, said core comprising a pair of spring sheet metal members having elongated stems welded together in flatwise juxtaposition, said stems having normally separated free end portions, each of said members, remote from said free end portions, being of generally Z-formation, with a first flange extending transversely away from the other member, a web extending substantially parallel to and away from its stem, and a free flange extending transversely away from said stem, said free flanges being formed for securement to a pan or other article.

3. Handle construction comprising a pair of mating heat insulating handle elements, each elements, each element being formed with a longitudinal recess having two parallel offset walls and an intervening transverse wall, for accommodating a similarly shaped metal handle core piece, one handle element having a lug projecting into the depression defined by two of said walls in said one handle element and also projecting into the depression defined by the corresponding two walls in the other handle element, said one handle element having a passage for entrance of a core piece into said one handle element, said other handle element having, adjacent said corresponding depression, a lug projecting so as to close said passage, said handle elements being formed for the reception of fastening means for fastening them together.

4. A handle construction comprising a supporting member having a yoke attachable to a pan or other article and an elongated shank extending from said yoke, each branch of said yoke having a first portion extending transversely away from the other branch and a second portion extending substantially parallel to said shank, a pair of mating heat insulating grip elements receiving said supporting member, said grip elements having registering longitudinal recesses in which said shank seats, the combined depth of said recesses being at least as great as but not substantially greater than the thickness of said shank, each of said grip elements having at one end of the elongated recess therein a deeper recess, with a wall transverse to said longitudinal recess therein and a second wall extending substantially parallel to said longitudinal recess therein, said first portion and a part of said second portion being engaged respectively with said walls, each grip element having a projection extending into said deeper recess in the other grip element and cooperating with said other grip element in substantially completely and separately enclosing the portions of said supporting member received therein, and means fastening said supporting member and grip elements together in operative assembly.

5. A handle construction comprising a metallic core having a yoke adapted to be secured to a pan or other article and having a shank, a pair of mating handle members enveloping said shank from opposite sides, fastening means passing through said handle members and shank, said shank having spring portions which tend to separate by reason of their resilience, said handle members holding said portions in closer juxtaposition than when said portions are free, the fastening means being threaded, whereby the resilience of said portions resists loosening of said threaded means.

6. Handle construction comprising a pair of mating heat insulating handle elements, each element being formed with a longitudinal recess having two parallel offset walls and an intervening transverse wall, for accommodating a similarly shaped metal handle core piece, one handle element having a lug projecting into the depression defined by two of said walls in said one handle element and also projecting into the depression defined by the corresponding two walls in the other handle element, said one handle element having a passage for entrance of a core piece into said one handle element, said other handle element having, adjacent said corresponding depression, a lug projecting so as to close said passage, and means for fastening said handle elements together.

7. A handle construction comprising a supporting member having a yoke attachable to a pan or other article and also having a shank extending from the crotch of said yoke, each branch of said yoke having a first portion extending transversely away from the other arm and a second portion extending substantially parallel to said shank, a pair of mating heat insulating grip elements recessed to receive and completely enclosing said shank, said first portions, individually, and the adjacent parts, individually, of said second portions, and means securing said grip elements and supporting member together in operative assembly.

8. A handle construction comprising a supporting member having a yoke attachable to a pan or other article and a shank extending from the crotch of said yoke, a pair of mating heat insulating grip elements recessed to receive and completely enclosing said shank and the adjacent portions, individually, of the branches of said yoke, and means securing said grip elements and supporting member together in operative assembly.

9. A handle construction comprising a supporting member having a yoke attachable to a pan or other article and also having a shank extending from said yoke, a heat insulating hand grip comprising mating members enveloping said shank and individually enveloping the adjacent portions of the branches of said yoke, one of said members having a projection extending from one side of said yoke and between and substantially engaging the inner faces of said portions and terminating flush with the other side of said yoke, the other member having a projection extending across and substantially engaging said other side of said yoke.

10. In a handle, a core having means attachable to a pan or the like and also having a shank, said shank comprising a pair of elongated spring elements joined together and arranged alongside each other, portions of said elements being spaced apart when free, whereby said portions are adapted to be held closer together by and thus exert pressure on opposite parts of a handle about said core.

FRED D. PATTI.

REFERENCES CITED

The following references are of record in the file of this patent:

UNITED STATES PATENTS

| Number | Name | Date |
| --- | --- | --- |
| 1,627,880 | Baxter | May 10, 1927 |
| 1,754,543 | Callum | Apr. 15, 1930 |
| 1,859,614 | Boever | May 24, 1932 |
| 2,205,819 | Mattoon | June 25, 1940 |
| 2,231,222 | Rosenheimer, Jr. | Feb. 11, 1941 |

Certificate of Correction

Patent No. 2,511,786                                                 June 13, 1950

FRED D. PATTI

It is hereby certified that error appears in the printed specification of the above numbered patent requiring correction as follows:

Column 4, lines 55 and 56, strike out the words and comma "each elements,";

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*